US006634026B1

(12) United States Patent
Jones

(10) Patent No.: US 6,634,026 B1
(45) Date of Patent: Oct. 14, 2003

(54) METHOD AND APPARATUS FOR CORRECTING COMMON ERRORS IN MULTIPLE VERSIONS OF A COMPUTER PROGRAM

(75) Inventor: Robert Dennis Jones, Hartland, WI (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/329,536

(22) Filed: Jun. 10, 1999

(51) Int. Cl.[7] ............................................... G06F 9/44
(52) U.S. Cl. ......................................................... 717/170
(58) Field of Search .................................. 717/168, 170

(56) References Cited

U.S. PATENT DOCUMENTS

| | | | | |
|---|---|---|---|---|
| 5,600,836 A | * | 2/1997 | Alter | 707/101 |
| 5,740,442 A | * | 4/1998 | Cox et al. | 395/704 |
| 5,758,346 A | * | 5/1998 | Baird | 707/101 |
| 5,761,668 A | * | 6/1998 | Adamchick | 707/101 |
| 5,765,145 A | * | 6/1998 | Masiello | 707/1 |
| 5,794,048 A | * | 8/1998 | Brady | 395/705 |
| 5,806,063 A | * | 9/1998 | Dickens | 707/6 |
| 5,903,895 A | * | 5/1999 | Hoffman et al. | 707/101 |
| 5,915,116 A | * | 6/1999 | Hochman et al. | 395/705 |
| 5,926,814 A | * | 7/1999 | Fridman | 707/6 |
| 5,956,510 A | * | 9/1999 | Nicholas | 395/705 |
| 5,966,541 A | * | 10/1999 | Agarwal | 395/712 |
| 6,002,873 A | * | 12/1999 | Carter et al. | 395/705 |
| 6,041,330 A | * | 3/2000 | Carman et al. | 707/101 |
| 6,064,817 A | * | 5/2000 | Carter et al. | 395/705 |
| 6,071,317 A | * | 6/2000 | Nagel | 717/4 |
| 6,078,734 A | * | 6/2000 | Carter et al. | 395/500.02 |
| 6,185,571 B1 | * | 2/2001 | Carter et al. | 707/103 |
| 6,233,728 B1 | * | 5/2001 | Carter et al. | 717/4 |
| 6,305,010 B2 | * | 10/2001 | Agarwal | 717/4 |
| 6,336,184 B1 | * | 1/2002 | Burke et al. | 712/244 |

OTHER PUBLICATIONS

"The Year 2000 and 2–digit A Guide for Planning and Implementation" Sixth Edition, IBM, Chapter 5, published Dec. 1996.*

Clear Case Concept Manual, ATRIA, Unix Edition Release 2.0 pp. 1–135, 1994.*
"The Norton Utilities Version 5.0 User's Guide", Disk Editor, pp. 55–57, 1990.*
"The Year 2000 and 2–Digit Dates: A Guide for Planning and Implementation", IBM, pp. iii–vi, Apr. 1997.*
"User's Guide to OS/2 Warp", IBM, p. 150, 1995.*
"COBOL Millenium Language Extensions Guide", IBM, chapters 1–8, Jun. 1998.*
"Application of Data–Centered Approach to Year 2000 Problem", Wei–Tek Tsai, IEEE, pp. 287–288, 1997.*
"LegacyAid Year 2000 Solution", Casemaker, pp. 1–21, Jul. 1998.*
"Seven Work PLans for Year–2000 Upgrade Projects", Dick Lefkon, pp. 111–117, May 1997.*
"Variable Classification for Software Maintenance and Application to The Year 2000 Problem", K. Kawabe et al. IEEE, pp. 44–50, Jun. 1998.*
"Dealing with Dates: Solutions for the Year 2000", Computer, Robert Martin, pp. 44–57, Mar. 1997.*
"A Resource Guide to Year 2000 Tools", Computer, N. Zvegintzov, pp. 58–63, Mar. 1997.*
"Using OS/2 2.1 Special Edition", Barry Nanie et al, Chapter 14 pp. 335–364, Apr. 1993.*

* cited by examiner

Primary Examiner—Todd Ingberg
(74) Attorney, Agent, or Firm—Ziolkowski Patent Solutions Group, LLC; Michael A. Della Penna; Carl B. Horton

(57) ABSTRACT

The present invention relates to a repair program for multiple versions of computer programs that have a common error by using a pattern search and substitution technique. The invention includes identifying a common error in a main computer program, finding a common code section that contains the common error, and locating a segment of the common code section that is modifiable. The code section is then modified by optimizing the code to perform the same functionality and adding additional code to correct the error. A repair program is then written to search other versions of the main computer program and perform the modification step automatically without having to manipulate the source or machine code manually on the various versions of the software.

20 Claims, 3 Drawing Sheets

METHOD AND APPARATUS FOR CORRECTING COMMON ERRORS IN MULTIPLE VERSIONS OF A COMPUTER PROGRAM

BACKGROUND OF THE INVENTION

The present invention relates generally to computer programs, and more particularly to a method and apparatus for correcting common errors in multiple versions of a computer program using pattern substitution.

It is commonly known that software programs are constantly updated, adding new features and repairing errors. Each update is considered a new version and oftentimes, there are many versions of a software program in existence at any given time. As a result, many versions of a program may have commonly-shared problems, such as a common Year 2000 (Y2K) problem.

To repair a Y2K problem in multiple versions of a computer program by conventional methods would include modifying the source code and creating yet another new version. If there are N existing versions of a given program, such a repair could require the creation of N new versions. Furthermore, when creating a new version of the program using compilation tools, the variables may be at different memory locations than in the prior version, which could result in additional problems. For example, because complex software may contain small errors that are sensitive to the locations of these variables, this technique may result in an unexpected change in the behavior of the program. Therefore, additional testing is required to determine that no undesired behavioral changes were induced. In other words, the programmer who is repairing the program for one problem, for example a Y2K problem, must thoroughly test each version of the program to ensure that no additional problems have been caused because of the repair.

In order to avoid this problem, one method of correcting a problem in a program includes modifying specific locations in the software. This prior art method is known as a "software patch" and the benefits of reduced testing are widely understood. However, one disadvantage of a software patch is that it requires intervention at a machine code level, and thus is not in an easily readable form. Another disadvantage of this method is that repeating this for each and every version of the software that has been created is time consuming and labor intensive.

It would therefore be desirable to have a method and apparatus that is capable of repairing many versions of a software program to address a common problem, such as the Y2K problem, with little intervention and minimal programmer time.

SUMMARY OF THE INVENTION

The present invention relates to a method and apparatus for correcting a common problem in multiple versions of a computer programming using a pattern substitution method that solves the aforementioned problems.

The present invention was developed to address a Y2K problem in multiple versions of a software program within a limited time period. However, the invention is not limited to Year 2000 repairs, but is applicable to any common problem experienced in multiple versions of a software program. The benefits of this technique are exemplified, however, when given a fixed deadline, such as what the Year 2000 problem imposes. The invention expands upon the prior art software patch technique by allowing a means of repairing multiple versions of software with a single repair program. The benefits of reduced testing are then multiplied by the number of versions of the program that are in existence, while the disadvantage of machine code intervention is incurred but a single time and reduces the potential of altering the behavior of any particular version of the program.

Therefore, in accordance with one aspect of the invention, a method of correcting a common error in multiple versions of a computer program includes identifying the common error in the computer program and finding a common code section that contains the common error. The method next includes locating a segment of the common code section that is modifiable, modifying the segment located to correct the common error, and then writing a repair program to search the other versions of the computer program and perform the modification step automatically for each version of the computer program.

In accordance with another aspect of the invention, a computer repair program stored on a computer readable storage medium and designed to repair an error in a main computer program stored in a computer is disclosed. The computer program is designed to search the main computer program for an affected segment of the code defined by a predetermined word string that is based on a previous review of an exemplary version of the main computer program. Once the repair program locates the affected segment, the repair program replaces the affected segment of code with a repaired segment.

Various other features, objects and advantages of the present invention will be made apparent from the following detailed description and the drawings.

BRIEF DESCRIPTION OF THE DRAWINGS

The drawings illustrate the best mode presently contemplated for carrying out the invention.

In the drawings.

DETAILED DESCRIPTION OF THE PREFERRED EMBODIMENTS

Figure 1:
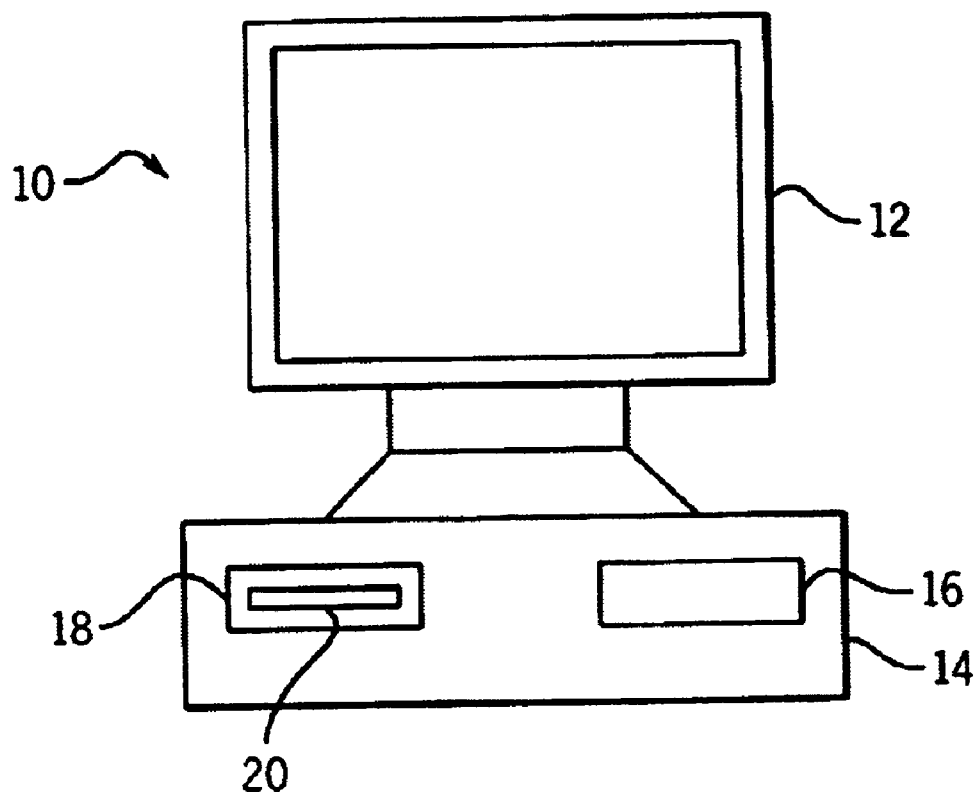
FIG. 1 is a schematic view of a general purpose computer.

Referring to FIG. 1, a general purpose computer 10 is commonly thought of as including a computer monitor 12 and the computer itself 14. The computer 14 includes a hard drive 16 capable of storing computer programs and a disk drive 18 for reading data and computer program files from a transportable medium 20. The transportable medium 20 may be a floppy disk or any other computer readable storage medium that can transport data into and from the computer 14. Typically, the computer program to be repaired is located on the hard drive 16 and the repair program of the present invention would reside on a transportable computer readable storage medium 20 to repair the main program on the hard drive 16. Alternatively, a network connection to the computer could be used to download the repair program.

Figure 2:
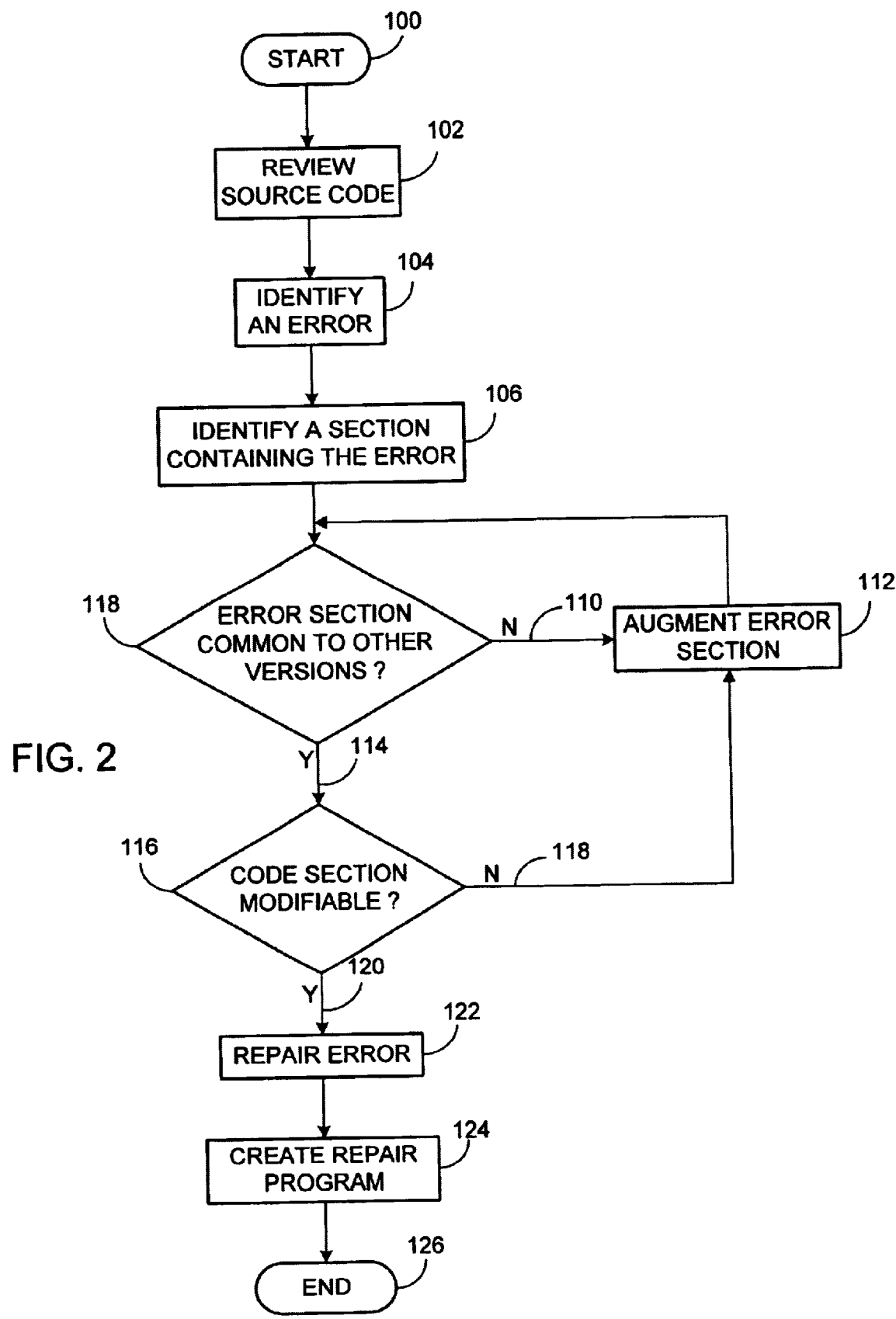
FIG. 2 is a flowchart of the method of creating the repair program.

Referring now to FIG. 2, a method of generating the repair program is shown. The method is designed to generate a repair program for the repair of multiple versions of a computer program affected by an error from a review of a single version of the computer program affected by the error.

In general, to write the repair program, the following steps must first be performed. First 100, the common error in the computer program must be identified 104, and then a common code section that contains the common error must be found 106 from a review of the source code 102. Specifically, to begin 100, an engineer reviews the source code 102 of one version of a computer program affected by an error. By reviewing 102 one version of the program affected by the error, the specific error as implemented in the source code of the affected program, can be identified 104. Then, a larger section of code, which contains the code including the error, is identified 106.

In further detail, the step of finding a common code section is determined not only on a section that contains the common error, but also on one that has not been previously modified as between multiple versions of the main computer program. The machine code that is examined is generated when compiling the common code to locate a segment that has relocatable code that can be modified manually. Therefore, once a specific section of code containing the error is identified 106, a determination 108 of whether the identified section is common to other versions of the computer program is made. In a Y2K or other repair, it is preferable to use a segment containing relocatable code where the address of the date data is relative. It is also preferred to avoid areas that require a linker to resolve the final location of variables since these addresses may differ from version to version. A subroutine that receives the date data, or its address, as an argument is preferred if the other criteria are met. The digital pattern of this affected segment of machine code is the original pattern that can then be found in multiple versions of the main program.

If it is determined that the identified section of code is not common to other versions of the affected program 110, the identified section is augmented to include more or less source code 112 in attempt to find a section of code that is common to other versions of the affected computer program. Following augmentation 112, the identified section is again checked to determine whether the section is common to other versions of the affected program 108.

Once a determination is made that the identified section is common to other versions of the affected program 114, a determination is made as to whether the identified section is able to be modified without rendering the program inoperable or causing further errors 116. Specifically the identified section must be able to be modified to correct the error without significantly changing the operation of the program or changing the operation of the program in a manner contrary to the programs intended purpose. Simply, if the identified section can be edited to correct the error without hindering the operation of the program or incurring negative effects, then the section is "modifiable." If the identified section is not deemed modifiable 118, the identified section must again be augmented 112 and another determination of whether the identified section is common to other versions of the affected program must be made 108.

Once the identified section is deemed modifiable 120, the error is corrected 122 and a repair program is created 124 to automatically search and repair other versions of the affected program.

In repairing the error and creating a repaired segment, the machine code of the affected segment is optimized to perform the same functionality, but with fewer machine codes in order to free machine code space. This freed space, saved by optimizing, is then available for the insertion of additional machine code to correct the error or problem in the code. The repaired segment, or the replacement pattern, is made identical in size to that of the original pattern, or the affected segment. Preferably, the byte size of the pattern is selected large enough so that the pattern is not mistakenly matched to other code segments that while similar, are not in need of repair. Therefore, it is preferred that the size of a pattern be at least approximately 20 words to easily avoid other code paths. However, the pattern size is clearly application specific and will vary. Optionally, the repair can be tested with a test run through the main program to ensure the search results are accurate, preferably, resulting in no more than one hit.

Once the common original pattern and a common replacement pattern have been identified, the repair program is written 124 that is capable of repairing multiple versions of the main program by locating the original pattern in the affected segment and substituting the replacement pattern comprising the repaired segment. The step of writing a repair program includes the steps of automatically searching for a word string matching the segment that is modifiable and replacing the located segment with a segment containing a repair code Referring to FIG. 3, a repair method and program 130 is shown in flowchart form. The repair program is designed to repair an error in the main computer program by, generally, searching the main computer program for an affected segment of code as defined by a predetermined word string based on a previous review of the code in an exemplary version of the main program, and then replacing the affected segment of the code with a repaired segment. Once the repair program is called 132 the program is checked to see if it has a patch identifier at the end 134, and if it does 136, the repair program exits at 138 because the patch identifier indicates that the program was already patched with this repair.

As long as there is no patch identifier 134, 140 a variable i is initiated 142. The variable i references a byte at the beginning of the original pattern that is to be replaced. An input byte from the main program is then read at 144 and the repair program checks to see if it is at the end of the file of the main program at 146. If it is 148, the computer exits the repair program 150 indicating that the main program is either not repairable with this repair program or does not require a repair, and that no patch was inserted. As long as the repair program is not at the end of the file 146, 152 the byte read at 144 is checked to see if it matches the original pattern 154, and if it does 156, the byte is added to a buffer 158. The buffer is used to store potential output bytes while the repair program searches for a match. The variable i is then incremented at 160 and the length of the variable is compared to a predetermined pattern length 162. As long as the variable is less than the predetermined pattern length 164, the repair program continues to loop and reads another byte at 144.

If the main program is still not at the end of the file 146, 152, and a byte does not match the pattern 154, 166, the buffer contents are checked at 168. If the buffer is empty 168, 170, the input byte is sent to an output 172 and the next input byte is read at 144. However, if the buffer is not empty 168, 174 the buffer content is emptied to the output 176 and the variable i is reinitialized 178. The input byte is written to the output 172, and the system returns to the beginning of the loop to read another input byte at 144.

This iterative loop continues until the variable is greater than the pattern length 162, 180, at which time the replacement pattern containing the repaired segment is inserted by first writing the replacement pattern to the output 182, reading the input byte from the main program 184, and while the main program is not at the end of the file 186, 188, writing the input byte to the output 190, and continuing to read another input byte from the main program 184. Once the end of the file is reached 186, 192, the output patch identifier is inserted at 194 and the repair program is ended at 196 with a successful program repair. The aforementioned output is an output that creates a new copy of the main program that has been repaired.

Although it is preferred to initially determine which versions of the main program were created using the same compilation tools and procedures, it is not necessary if there is an uncertainty of the options selected. As long as the repair program is able to find the original pattern in its search of a particular version of the main program, then it will likely be able to perform the repair successfully, and therefore, the repair program can be run on any version of the main program even if the compilation options used to create that version cannot be determined.

In applications that use a common subroutine, it would be preferable to make the repair in the common subroutine if the subroutine contains an appropriate pattern. In this case, it may be possible to use the present invention to repair a problem in multiple versions of multiple programs.

Figure 3:
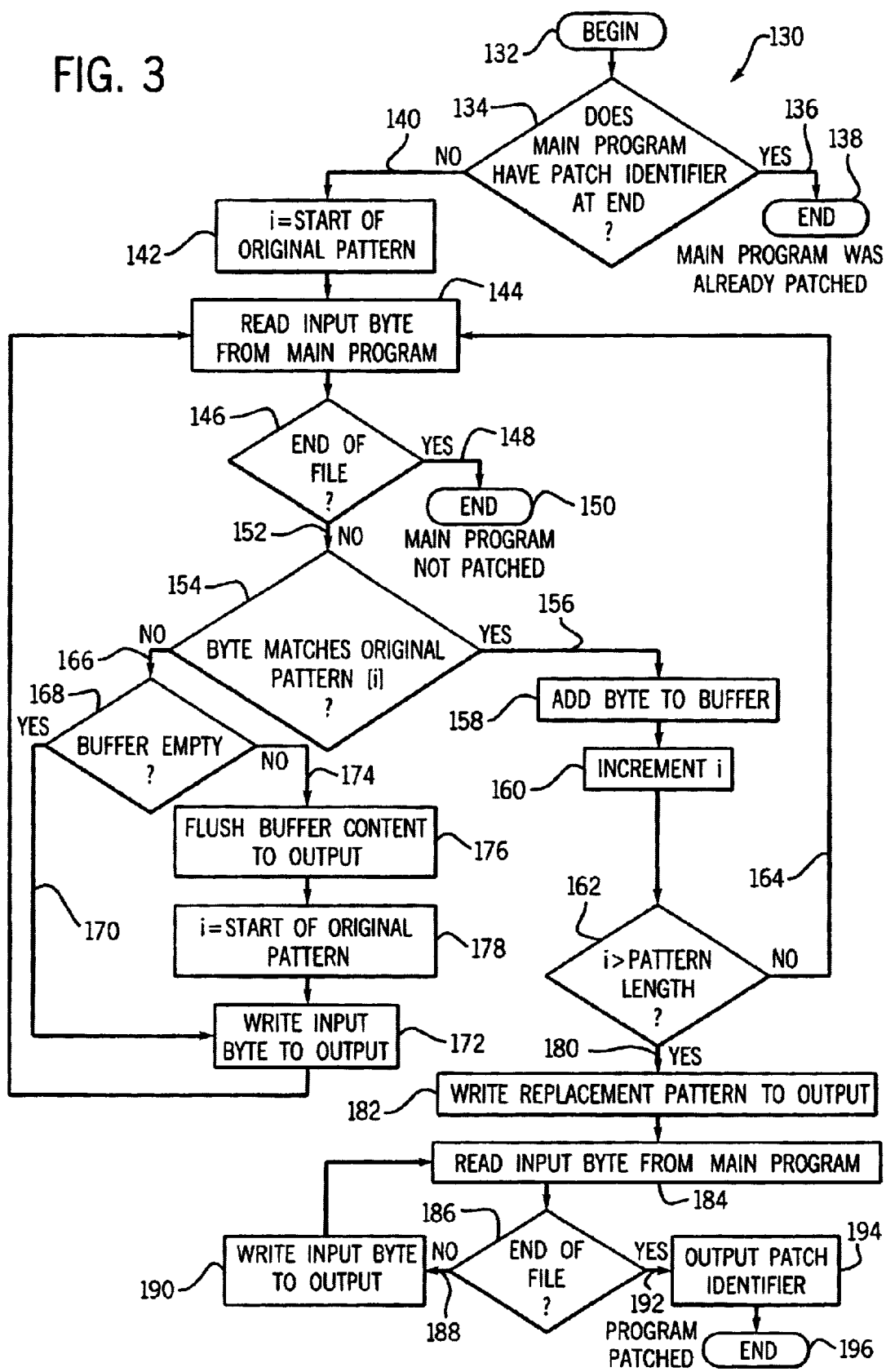
FIG. 3 is a flowchart of the repair program of the present invention for use on the computer of FIG. 1.

To accomplish the aforementioned test run through the main program, a test can be accomplished by running the repair program shown in FIG. 3, then running the repair program a second time while ignoring the patch identifier in decision 134. In other words, a test run would begin at initializing i at 142. If the program exits without a patch at 150, then there was only one pattern. Otherwise, the pattern should be made longer.

The present invention has been described in terms of the preferred embodiment, and it is recognized that equivalents, alternatives, and modifications, aside from those expressly stated, are possible and within the scope of the appending claims.

What is claimed is:

1. A method of correcting a common error in multiple versions of a computer program comprising the steps of:
    identifying an error common to multiple versions of a computer program;
    finding a code section common to at least two of the multiple versions of the computer program that contains the common error;
    locating a segment of the code section that is modifiable;
    modifying the segment located to correct the error; and
    creating a repair program to search other versions of the computer program and automatically perform the modification step on the other versions of the computer program.

2. The method of claim 1 further comprising the step of finding a common code section that not only contains the error common to the multiple versions of the computer program, but also has not been modified as between multiple versions of the computer program.

3. The method of claim 1 wherein the step of locating a segment that is modifiable is further defined as locating the error common to the multiple versions of the computer program in a machine code of the common code section of the computer program.

4. The method of claim 3 wherein the step of locating a segment that is modifiable is further defined as examining the machine code generated when compiling the common code to locate a segment that comprises relocatable code that can be modified manually.

5. The method of claim 4 wherein the common error is a Year 2000 error and the segment is located in a subroutine that receives date data.

6. The method of claim 3 further comprising the step of optimizing the segment located to perform similarly with fewer machine codes to free machine code space.

7. The method of claim 6 wherein the step of modifying the segment includes inserting new machine code in the machine code space.

8. The method of claim 7 further comprising the step of filling the machine code space with a replacement pattern of identical size.

9. The method of claim 1 wherein the step of locating a segment further includes sizing the segment large enough to be unique within the computer program.

10. The method of claim 1 wherein the step of creating a repair program further comprises the steps of automatically searching for a word string matching the segment that is modifiable and replacing the located segment with a segment containing a code repair.

11. A computer repair program stored on a computer readable storage medium to repair an error in a one version of an affected computer program stored in a computer, the computer repair program programmed to:
    automatically search the one version of the affected computer program for an affected segment of code defined by a predetermined word string based on a previous review of another version of the affected computer program; and
    automatically replace the affected segment of code of the one version of the affected computer program with a repaired segment.

12. The computer repair program of claim 11 wherein the computer repair program is further programmed to find a common code section that not only contains the common error, but also has not been modified as between the one version and the another versions of the affected computer program.

13. The computer repair program of claim 11 wherein the computer repair program is further programmed to locate the common error in a machine code of the one version of the affected computer program in the common code section.

14. The computer repair program of claim 11 wherein the computer repair program is based on an examination of machine code generated when compiling the code common to the one version and the another version of the affected computer program to locate a segment that comprises relocatable code that can be modified manually.

15. The computer repair program of claim 11 wherein the repaired segment contains code to perform an identical function as that of the affected segment without the error.

16. The computer repair program of claim 11 wherein the repaired segment includes optimized code to perform an identical function as that of the affected code without the error and includes additional code to correct the error throughout the one version of the affected computer program.

17. The computer repair program of claim 16 wherein the repaired segment is the same byte size as the affected segment.

18. The computer repair program of claim 11 wherein the predetermined word string is unique within the one version of the affected computer program such that only a single repaired segment is inserted into the one version of the affected computer program.

19. The computer repair program of claim 11 wherein the search is further defined as a search of subroutines in the one version of the affected computer program.

20. The computer repair program of claim 11 wherein the affected segment of code replacement is performed in a subroutine that is accessible by multiple programs.

* * * * *